(12) United States Patent
Elsner et al.

(10) Patent No.: US 11,713,194 B2
(45) Date of Patent: Aug. 1, 2023

(54) MODULAR CONVEYOR BELT HAVING ALTERNATING DRIVE SURFACES

(71) Applicant: Habasit AG, Reinach (CH)

(72) Inventors: Dietmar Elsner, Lörrach (DE); Stefan Simmendinger, Wahlen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 17/608,447

(22) PCT Filed: Apr. 28, 2020

(86) PCT No.: PCT/EP2020/061694
§ 371 (c)(1),
(2) Date: Nov. 2, 2021

(87) PCT Pub. No.: WO2020/221718
PCT Pub. Date: Nov. 5, 2020

(65) Prior Publication Data
US 2022/0212875 A1     Jul. 7, 2022

(30) Foreign Application Priority Data
May 2, 2019 (EP) ..................................... 19172200

(51) Int. Cl.
*B65G 17/08*     (2006.01)
*B65G 23/06*     (2006.01)
*B65G 17/40*     (2006.01)

(52) U.S. Cl.
CPC .......... *B65G 17/083* (2013.01); *B65G 17/40* (2013.01); *B65G 23/06* (2013.01); *B65G 2207/26* (2013.01); *B65G 2207/30* (2013.01)

(58) Field of Classification Search
CPC .... B65G 17/083; B65G 17/086; B65G 17/40; B65G 17/08; B65G 23/06; B65G 2207/26; B65G 2207/30
(Continued)

(56) References Cited

U.S. PATENT DOCUMENTS 506,456 A * 10/1893 Adt ........................ B65G 17/08
4,556,142 A    12/1985 Lapeyre
(Continued)

FOREIGN PATENT DOCUMENTS

CN     103261058 A     8/2013
CN     103771081 A     5/2014
(Continued)

*Primary Examiner* — Mark A Deuble
(74) *Attorney, Agent, or Firm* — Hodgson Russ LLP

(57) ABSTRACT

A modular conveyor belt (10) comprises a plurality of first rows of one or more belt modules (20) and a plurality of second rows of one or more belt modules (40). Each of the first rows comprises a first drive surface (26) for receiving a force-transmitting surface of a first series of force-transmitting surfaces of a drive sprocket, the first drive surfaces (26) of the first rows being arranged along a first line in a direction of belt travel (T). Each of the second rows comprises a second drive surface (48) for receiving a force-transmitting surface of a second series of force-transmitting surfaces of the drive sprocket, the second drive surfaces (48) of the second rows being arranged along a second line in the direction of belt travel (T). The first line and the second line are offset with respect to each other. Each belt module (20) of the first rows comprises a first middle section (22) between two link sections (21), which has a first flat top surface and is arranged adjacent to a second middle section (42) between two link sections (41) of an adjacent belt module (40) of one of the adjacent second rows having a second flat top surface. The first flat top surface and the second flat top surface have a different width in the direction of belt travel (T) at least in adjacent zones and the first and second middle sections (22, 42) are devoid of linking means.

14 Claims, 6 Drawing Sheets

Figure 1:
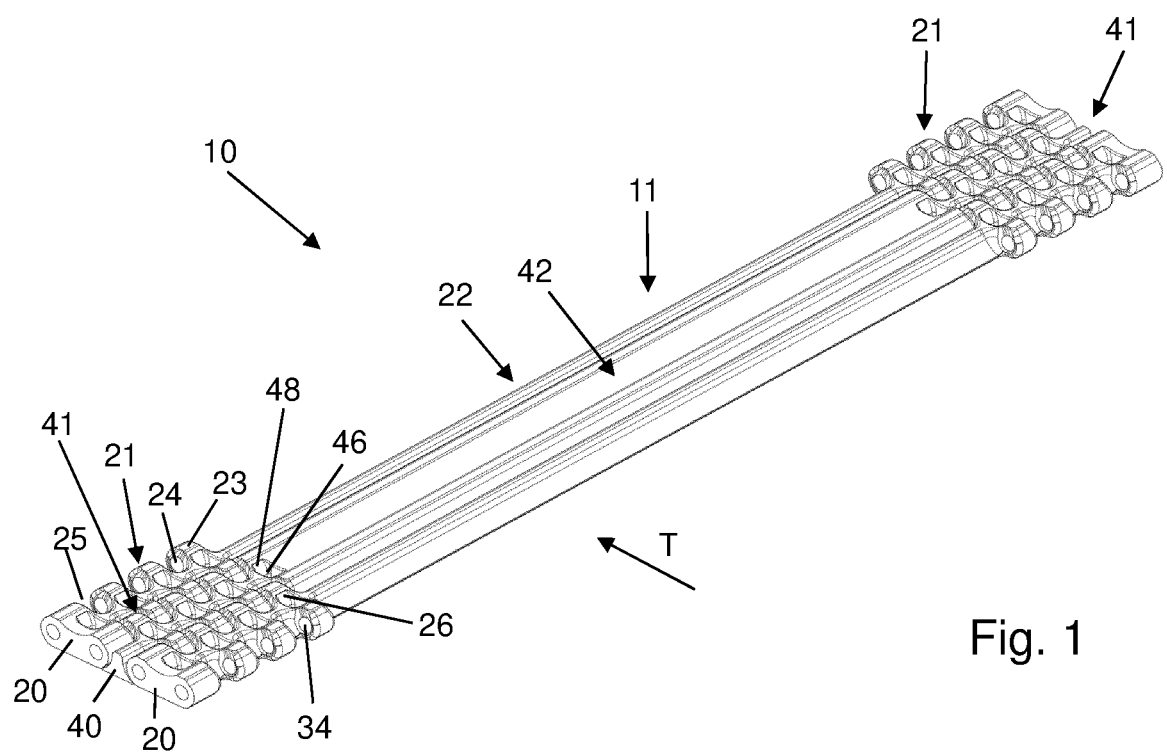

(58) Field of Classification Search
USPC .......................................................... 198/853
See application file for complete search history.

(56) References Cited

U.S. PATENT DOCUMENTS

| | | | | |
|---|---|---|---|---|
| 5,170,883 | A * | 12/1992 | Ledet | B65G 17/08 |
| | | | | 198/834 |
| 5,335,768 | A * | 8/1994 | Schladweiler | B65G 47/52 |
| | | | | 474/224 |
| 6,766,899 | B1 * | 7/2004 | Guldenfels | B65G 17/08 |
| | | | | 198/834 |
| 9,745,134 | B1 | 8/2017 | Bradshaw | |
| 2002/0020612 | A1 | 2/2002 | Guldenfels | |
| 2003/0017896 | A1 | 1/2003 | Markley et al. | |
| 2005/0241924 | A1 | 11/2005 | Damkjaer | |
| 2006/0278500 | A1 | 12/2006 | Guernsey | |
| 2009/0000921 | A1 * | 1/2009 | Guldenfels | B65G 17/08 |
| | | | | 198/834 |
| 2009/0107805 | A1 | 4/2009 | Layne et al. | |
| 2009/0266683 | A1 | 10/2009 | Ozaki et al. | |
| 2012/0318644 | A1 | 12/2012 | MacLachlan et al. | |
| 2016/0185529 | A1 * | 6/2016 | Bauer | B65G 17/40 |
| | | | | 198/853 |
| 2016/0332821 | A1 * | 11/2016 | van den Berg | B65G 17/08 |
| 2016/0368713 | A1 | 12/2016 | Balsells Mercadé | |
| 2017/0088356 | A1 * | 3/2017 | Lucchi | B65G 17/34 |
| 2022/0212880 | A1 * | 7/2022 | Simmendinger | B65G 45/22 |

FOREIGN PATENT DOCUMENTS

| | | | |
|---|---|---|---|
| WO | 2015108416 | A1 | 7/2015 |
| WO | 2016069122 | A1 | 5/2016 |
| WO | 2017139137 | A1 | 8/2017 |

* cited by examiner

MODULAR CONVEYOR BELT HAVING ALTERNATING DRIVE SURFACES

The present invention relates to a modular conveyor belt according to the preamble of claim 1.

Whenever objects have to be transported over comparatively short distances, and in particular within a production site, modular conveyor belts are a suitable and commonly used tool. Depending on the actual application the modular conveyor belt is used for, the modular conveyor belt must comply with varying requirements.

In particular, modular conveyor belts that are used in food industry have to be easily cleanable. Further, the material of the modular conveyor belt should not contaminate foodstuff in any way. Therefore, in food industry plastic conveyor belts are widely used. Contrary to metal conveyor belts, they do not corrode, are lightweight and are easy to clean. For easier scalability, quite often modular plastic conveyor belts are used that are made up of moulded plastic belt modules that can be arranged side-by-side in rows of selectable width. A series of spaced apart link ends arranged at the leading and trailing edges (sides) of the modules include aligned openings to accommodate a pivot rod. The link ends along one side of a row of belt modules are interconnected with the link ends of an adjacent row of belt modules. A pivot rod journaled in the aligned openings of connected modules forms a hinge between adjacent rows. Rows of belt modules are then connected together to form an endless conveyor belt capable of articulating about a drive sprocket. If the length of the modular conveyor belt exceeds a certain size, quite often conveyor rollers or supporting slides are used to support the modular conveyor belt. Such conveyor rollers can be either rolling passively (essentially being driven by the modular conveyor belt), or they can be active, meaning that they actively drive the modular conveyor belt. In the latter case, typically sprockets are used.

Furthermore, in food industry, solid or flat-top modular plastic conveyor belts are frequently used for meat, fish, or other products that drip or tend to drop crumbs or particles. The top of such belts can present a smooth, flat surface with very small gaps at the proximity region between two adjacent belt modules. Thanks to the usual design with link ends that comprise pivot rod openings and pivot rods that are arranged through such pivot rod openings, it is possible to bend the modular conveyor belt around sprockets, in particular around end-sited sprockets, so that an endless belt can be formed. In such regions where adjacent belt modules are tilted with respect to each other, gaps are normally opened between two adjacent belt modules. This makes it possible to clean the gaps between the adjacent belt modules, in particular link ends, which is particularly important in the food industry. Steam or hot water, which may include cleaning agents and disinfectants, can be used for such cleaning purposes.

In some cases, the modular conveyor belts need to have comparatively small belt modules and small pitches, in particular pitches of 2.54 cm (1 inch) or smaller. This brings up problems with the driving of the modular conveyor belt, because the driving teeth of a drive sprocket cannot be made too thin, otherwise they break easily. In order to be still able to use teeth which are thick enough to not break, a conveyor design has been found where the teeth of a drive sprocket contact only every second belt module row. Such a design is, however, somewhat problematic, because only a limited number of belt modules have to relay the driving force of the drive sprocket to the remaining belt modules of the modular conveyor belt. This can cause stability problems and a significantly increased wear of the modular conveyor belt. To minimise these problems, adjacent belt modules of adjacent rows of belt modules are connected by intercalating link ends provided over their whole lengths. A disadvantage is that the cleaning of such belt modules is somewhat cumbersome.

U.S. Pat. No. 4,556,142 A discloses another conveyor with a modular conveyor belt, where drive sprockets having two parallel series of teeth engage alternately drive surfaces on first rows of belt modules and drive surfaces on second rows of belt modules, wherein the first rows of belt modules and the second rows of belt modules are alternately interlinked with each other. The disclosed modular conveyor belt is prone to agglomeration of dirt or bacteria and cumbersome to clean.

There is a need for modular conveyor belts, in particular modular conveyor belts having comparatively small belt modules and small pitches, in particular pitches of 2.54 cm (1 inch) or smaller, which are better cleanable and/or less prone to contamination.

The present invention meets the above-described need by providing a modular conveyor belt according to independent claim 1 and a conveyor comprising such a modular conveyor belt according to independent claim 13. Particularly advantageous embodiments of the invention result from the dependent claims.

The core of the invention lies in the following: A modular conveyor belt comprises a plurality of first rows of one or more belt modules and a plurality of second rows of one or more belt modules. Each belt module comprises at least two link sections and the first rows and the second rows are alternately interlinked with each other by intercalating link sections of adjacent belt modules of adjacent first and second rows. Each of the first rows comprises a first drive surface for receiving a force-transmitting surface of a first series of force-transmitting surfaces of a drive sprocket, the first drive surfaces of the first rows being arranged along a first line in a direction of belt travel. Each of the second rows comprises a second drive surface for receiving a force-transmitting surface of a second series of force-transmitting surfaces of the drive sprocket or a further drive sprocket, the second drive surfaces of the second rows being arranged along a second line in the direction of belt travel. The first line and the second line are offset with respect to each other. At least one of the belt modules of one of the first rows comprises a first middle section between two link sections, which has a first flat top surface and is arranged adjacent to a second middle section between two link sections of an adjacent belt module of one of the adjacent second rows having a second flat top surface. The first flat top surface and the second flat top surface have a different width in the direction of belt travel at least in adjacent zones and the first and second middle sections are devoid of linking means.

By providing a first line of first drive surfaces on the first rows of one or more belt modules and a second line of second drive surfaces on the second rows of one or more belt modules, the driving force of the at least one drive sprocket can be transmitted to each row of one or more belt modules. This allows to design the drive surfaces of the belt modules, the force-transmitting surfaces of the drive sprocket(s) and the connections between adjacent belt modules of adjacent rows smaller and less robust than in case where the driving force of the at least one drive sprocket is transmitted to only every alternate row of belt modules. It is to be noted that a less robust design usually implies that the respective components can be reduced in size and/or can be produced of less robust material and/or with thinner material layers.

Due to the offset with respect to each other of the first line of first drive surfaces and the second line of second drive surfaces (in the width direction of the modular conveyor belt, perpendicular to the direction of belt travel), more space is available for the arrangement of the drive surfaces in successive first and second rows of one or more belt modules. The offset is preferably comparatively small, preferably no unused drive surface is placed between those two lines of drive surfaces. Instead of two lines of drive surfaces, a larger number like three, four, five or six lines of drive surfaces can be foreseen. Those lines may be arranged as blocks of preferably neighbouring (adjacently placed) lines of drive surfaces. Of course, a plurality of such blocks can be used as well. In particular, those blocks can be spaced at a certain distance from each other. As an example, if a belt module comprises two (or possibly more) link sections, a plurality or each of the link sections may be provided with a block of drive surfaces, being part of a block of lines of drive surfaces seen over a plurality of rows of one or more belt modules.

The fact that at least one of the belt modules of one of the first rows comprises a first middle section between two link sections, which has a first flat top surface and is arranged adjacent to a second middle section between two link sections of an adjacent belt module of one of the adjacent second rows having a second flat top surface, wherein the first flat top surface and the second flat top surface have a different width in the direction of belt travel at least in adjacent zones, allows to arrange the middle sections of adjacent belt modules in a space-saving manner, and nevertheless to provide an essentially closed combined flat top surface, if desired. In particular the middle sections are thus better cleanable and less prone to contamination.

The fact that the first and second middle sections are devoid of linking means makes them better cleanable and less prone to contamination.

Preferably, the second rows of one or more belt modules are devoid of first drive surfaces and/or the first rows of one or more belt modules are devoid of second drive surfaces. Because the second rows do not need first drive surfaces and the first rows do not need second drive surfaces, it is advantageous to avoid such unnecessary drive surfaces. This simplifies the design and makes the belt modules better cleanable and less prone to contamination.

In an advantageous embodiment of the modular conveyor belt according to the invention, the link sections comprise a first plurality of link ends extending in a direction of belt travel and having a pivot rod opening disposed therein in a direction substantially perpendicular to the direction of belt travel, and a second plurality of link ends extending in a direction opposite to the direction of belt travel and having a pivot rod opening disposed therein in a direction substantially perpendicular to the direction of belt travel, the first plurality of link ends of one of the link sections and the second plurality of link ends of an adjacent link section of an adjacent belt module being intercalated and hingedly connected by at least one pivot rod disposed through at least some of the pivot rod openings.

The hingedly connecting of link sections of adjacent belt modules by intercalating link ends and pivot rods is easy to realise. Moreover, using such a design makes the modular conveyor belt compatible with present designs of modular conveyor belts. Therefore, the modular conveyor belt can be used in combination with present apparatuses with minor modifications, or even without any modification at all.

Advantageously, the distance between two successive first drive surfaces along the first line in the direction of belt travel is equal to the distance between two successive second drive surfaces along the second line in the direction of belt travel, and preferably the first drive surfaces and the second drive surfaces are offset in the direction of belt travel with respect to each other by a half of this distance. With such a design, a particularly advantageous distribution of the introduced forces can be realised. Such a design is also advantageous for geometrical reasons and can easily be realised, for example with two different sets of belt modules or even with a single set of belt modules comprising first and second drive surfaces.

In a preferred embodiment, at least one of the first drive surfaces and/or the second drive surfaces is formed by a bordering wall of an indentation on a bottom side of one of the belt modules and/or by an end surface of one of the link ends. This is easily realizable and allows to reduce the amount of material used for the belt modules and/or to use elements of the belt module that have to be provided anyhow (albeit it may be necessary to adapt the respective element to serve as a drive surface).

Preferably, adjacent first and second middle sections of adjacent belt modules have complementary first and second flat top surfaces so as to form an essentially closed combined flat top surface when the adjacent belt modules are arranged in a substantially straight line. This makes the belt modules less prone to contamination, in particular their bottom sides.

In an advantageous embodiment, the belt modules of the first rows and of the second rows are identical, but the belt modules of the second rows are turned by 180° with respect to the belt modules of the first rows. In this way, a single type of belt modules is sufficient, which may facilitate production and maintenance of the modular conveyor belt. In particular, only a single type of spare belt modules has to be stored.

In an alternative advantageous embodiment, the belt modules of the first rows and of the second rows are of a different design. For example, a second middle section may be wider in the direction of belt travel than a first middle section. Such a design might prove to be advantageous as well, since the individual belt modules may be designed less complex and/or may be optimised for a certain functionality of the modular conveyor belt.

In a preferred embodiment of the modular conveyor belt according to the invention, between a belt module of one of the first rows and an adjacent belt module of one of the adjacent second rows a gap is formed which broadens towards the bottom of the modular conveyor belt. With such a design, it is possible to further improve the cleanability of the modular conveyor belt, in particular when using impinging fluid jets for cleaning, due to the fluid guiding effect of the gap. Namely, impinging fluid can be directed in a way that cleaning of a proximity region (gap region between two adjacent belt modules) can be improved. This may be particularly the case for the region of the middle sections.

Advantageously, the belt modules are designed and arranged such that the gap is essentially closed at a top surface of the modular conveyor belt when the adjacent belt modules of the first and second rows are aligned along a substantially straight line and such that the gap is open at the top surface of the modular conveyor belt when the adjacent belt modules of the first and second rows are tilted with respect to each other. In this way, it is less likely that any goods (or parts thereof) that are to be transported by the modular conveyor belt can get stuck between adjacent belt modules or may even pass through between two adjacent belt modules (and consequently get lost). Nevertheless, it is still possible to provide a very effective cleaning possibility in certain areas, in particular in areas where the modular conveyor belt runs over a drive sprocket or idler and is returned.

In a preferred embodiment, at least one of the belt modules of the modular conveyor belt comprises on its bottom side at least one fluid guiding structure designed and arranged so as to deflect a fluid jet impinging on the bottom side and guide the deflected fluid jet towards one of the adjacent belt modules of one of the adjacent rows.

Since fluid jets are frequently used for cleaning purposes in combination with modular conveyor belts, in particular in food industry, those fluid jets can be directed towards portions of the modular conveyor belt that are particularly prone to agglomeration of dirt or bacteria and/or that are problematic to be reached by a fluid jet that comes directly out of a fluid nozzle (no direct line-of-sight), when using at least one fluid guiding structure. A fluid jet that comes out of a nozzle can be directed to the fluid guiding structures of the modular conveyor belt and is then deflected or redirected by the fluid guiding structures into a different direction (as compared to the original direction of the fluid jet). In particular, the deflected fluid jet is guided into a direction, in particular towards the adjacent belt modules of one of the adjacent rows, where a cleaning action of the fluid jet is particularly desirable. This can be an area that can hardly be reached by a directly impinging fluid jet; an area that needs a particularly thorough cleaning; an area, where a cleaning process is more effective, if the fluid jet impinges in a certain direction (for example because particles will be washed out of the modular belt); and the like.

For example, the fluid guiding structure can be shaped in a way that the aiming point/outflow direction, towards which the fluid jet is directed or guided, remains more or less constant during a forward movement of the modular conveyor belt in its moving direction or direction of belt travel (at least when being at certain repetitively occurring positions). However, additionally or alternatively, the fluid guiding structure can be designed in a way that the aiming point and/or direction, where the impinging fluid jet is directed to, varies during the forward movement of the modular conveyor belt. The impinging fluid jet can impinge in a direction that is essentially perpendicular to the respective bottom surface of the belt module, or can be tilted with respect to the belt module, for example at an angle of up to 10°, 20°, 30°, 40° or 50° (with respect to the perpendicular direction). The fluid guiding structure can be shaped in a way that the cross section of the impinging fluid jet remains more or less unaltered. Additionally or alternatively, the cross section of the impinging fluid jet can be influenced by the fluid guiding structure as well.

A region, where two adjacent belt modules of the first and second row of one or more belt modules come close to each other (and possibly may touch each other, at least at certain positions during a movement cycle of the modular conveyor belt), may be called a proximity region. It is to be noted that such a proximity region typically necessitates a thorough cleaning, since in these regions the top surface of the modular conveyor belt, onto which goods are placed, is interrupted by a small gap. As an example, if foodstuff is transported, any fluid that flows out of the goods will usually flow through the small gap between two adjacent belt modules. Therefore, thorough cleaning of the respective region is important.

Another region that is somehow problematic with respect to cleaning considerations is the region of the link ends. This is not only because portions of the link ends are arranged in the proximity region, but also because in the link end region, the design of the modular conveyor belt is typically relatively complicated (at least on the bottom side of the belt modules) and typically has some regions that are hard to reach from the outside. Quite often there will be areas that cannot be reached by a line-of-sight axis from the outside and are therefore problematic to clean with directly impinging fluid jets. Only for completion, it should be noted that the fluid jet can for example contain water (in particular water at an elevated temperature and/or water containing some cleansing additive and/or some disinfectant). However, the advantages of the presently proposed modular conveyor belt can be achieved with essentially all kinds of fluid. When talking about fluid jets, certainly a different shape of a water stream can be chosen as well. As an example, some kind of a water curtain can be used as well.

Advantageously, at least one of the fluid guiding structures comprises an outwardly fan-shaped portion designed and arranged so as to direct and spread an impinging fluid jet towards one of the adjacent belt modules of one of the adjacent rows. With such a design, it is possible to direct the fluid towards a comparatively large portion of the modular conveyor belt, while still using a comparatively small fluid jet. Furthermore, it is possible to split up the fluid jet into a plurality of fluid jets (where the resulting fluid jets need not necessarily be separate from each other; i.e. some kind of a fluid curtain might be created). In this way, it is particularly simple to clean the side surfaces of the link ends, in particular of link ends that have a pivot rod opening. In particular, a contact region between a pivot rod opening of a link end and a pivot rod can be cleaned more easily using such a design.

When talking about a fan-shaped portion, this preferably relates to an arrangement where a circular jet with a comparatively small diameter is spread over a certain width (in particular in the widthwise direction of the modular conveyor belt), while its height remains comparatively small (for example about the same size like the original diameter of the impinging fluid jet). This can be reached by some kind of V-shaped channel, where the opening angle of the channel can be up to 10°, 20°, 30°, 40° or 50° (where a lower limit for the angle can be 0° or one of the previously mentioned angles).

Preferably, at least one of the fluid guiding structures is shaped without edges or corners. The avoidance of edges and corners, i.e. the use of rounded or arcuate shapes, results in a smoother deflection and guidance of an impinging fluid jet. Turbulences can be reduced.

In a preferred embodiment of the modular conveyor belt according to the invention, at least one of the fluid guiding structures has a channel-like design. Such a channel-like design makes it possible to deflect and guide the impinging fluid jet into the desired direction.

Preferably, at least one of the fluid guiding structures is arranged between two of the link ends of one of the belt modules. This makes it possible to easily deflect and guide the impinging fluid jet to side surfaces of both link ends and to the front surface and both side surfaces of an intercalating link end of an adjacent belt module of an adjacent row of one or more belt modules.

In an advantageous embodiment, at least one of the fluid guiding structures has a trough-like shape. Such a trough-like shape makes it easier to deflect and guide the impinging fluid jet to the front surface and both side surfaces of an intercalating link end of an adjacent belt module of an adjacent row of one or more belt modules.

It should be mentioned that in case a plurality of fluid guiding structures are used, those fluid guiding structures can have essentially the same design and/or can have different designs. Of course, it is possible to use a first fraction of the fluid guiding structures with a first design, while a second fraction of the fluid guiding structures can have a different design. The fractional shares may vary, as well as the number of different designs.

A conveyor according to the invention comprises a modular conveyor belt according to the invention as discussed above and at least one drive sprocket comprising a first series of force-transmitting surfaces for engaging the first drive surfaces of the first rows of one or more belt modules and a second series of force-transmitting surfaces for engaging the second drive surfaces of the second rows of one or more belt modules.

In an advantageous embodiment, the force-transmitting surfaces for engaging the first drive surfaces are provided on a first series of teeth of the at least one drive sprocket and the force-transmitting surfaces for engaging the second drive surfaces are provided on a second series of teeth of the at least one drive sprocket, wherein the first series of teeth and the second series of teeth are preferably arranged offset from each other in the direction of belt travel of the modular conveyor belt.

Advantageously, the first series of teeth and the second series of teeth are arranged adjacent to each other in a direction perpendicular to the direction of belt travel of the modular conveyor belt.

Furthermore, a fluid supply system with at least one fluid nozzle or orifice may be provided that may be arranged facing the bottom side of the modular conveyor belt and/or may be arranged in the vicinity of a drive sprocket and/or an idler. This way, it is easy to efficiently clean the modular conveyor belt.

Figure 2:
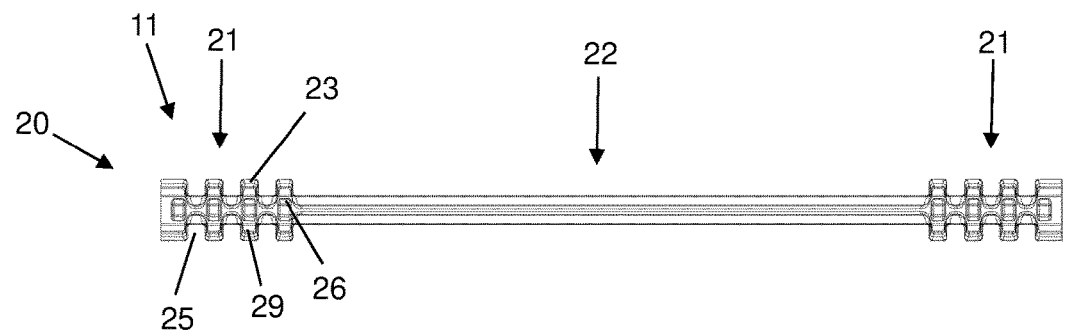
Figure 3:
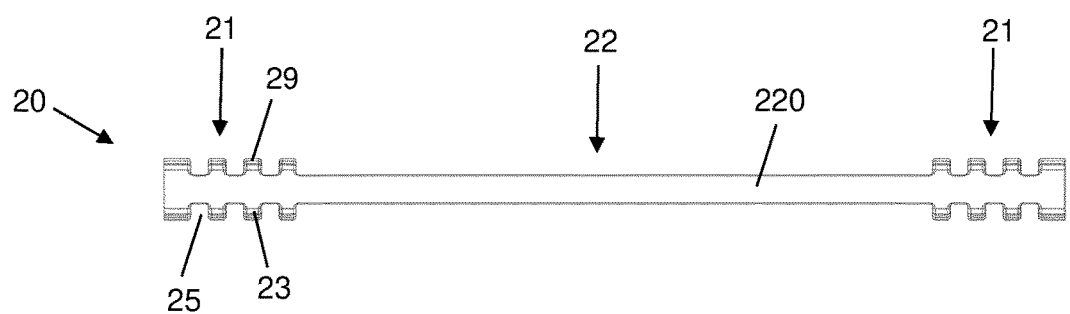
Figure 4:
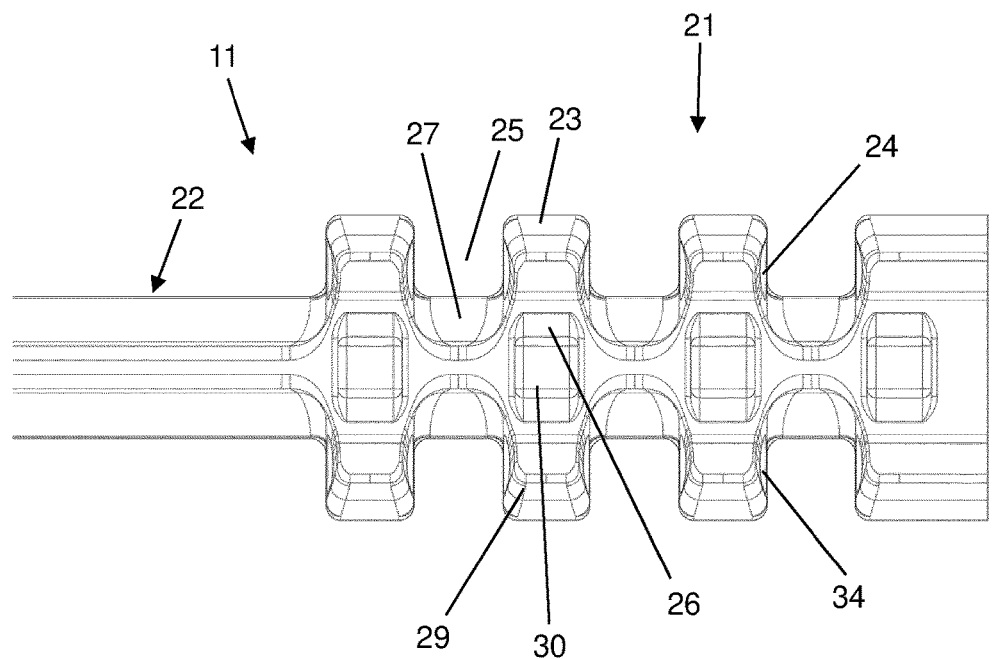
Figure 5:
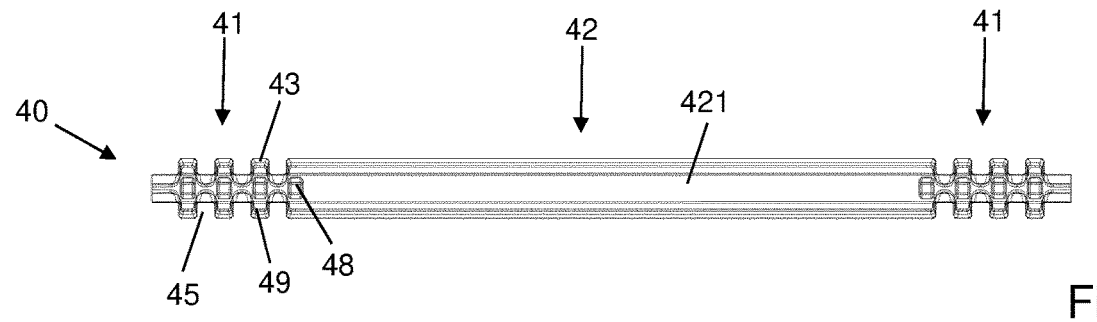
Figure 6:
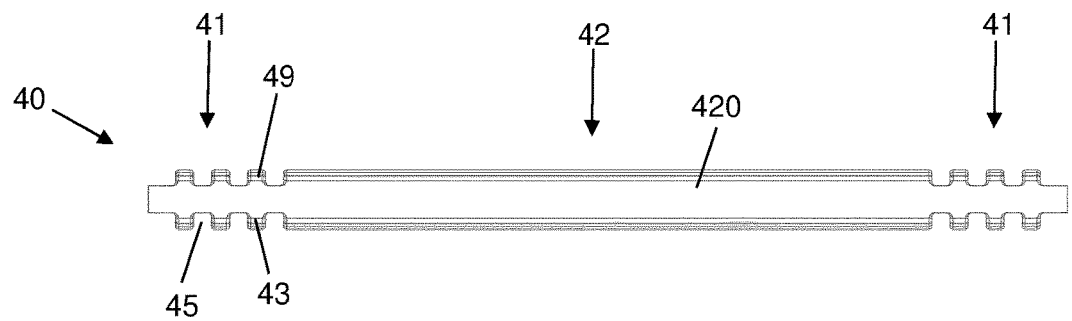
Figure 7:
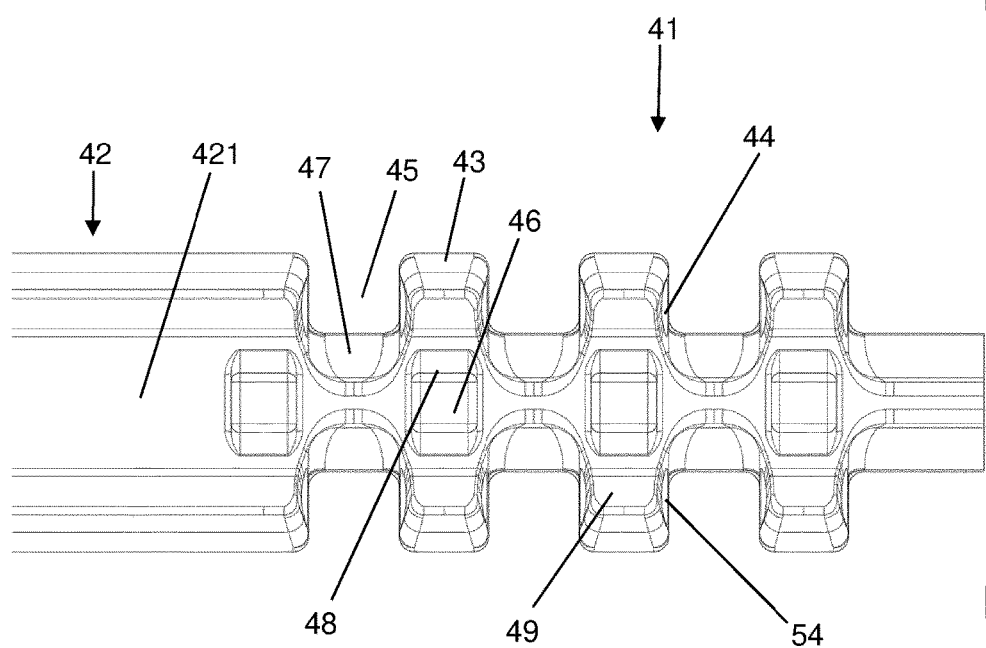
Figure 8:
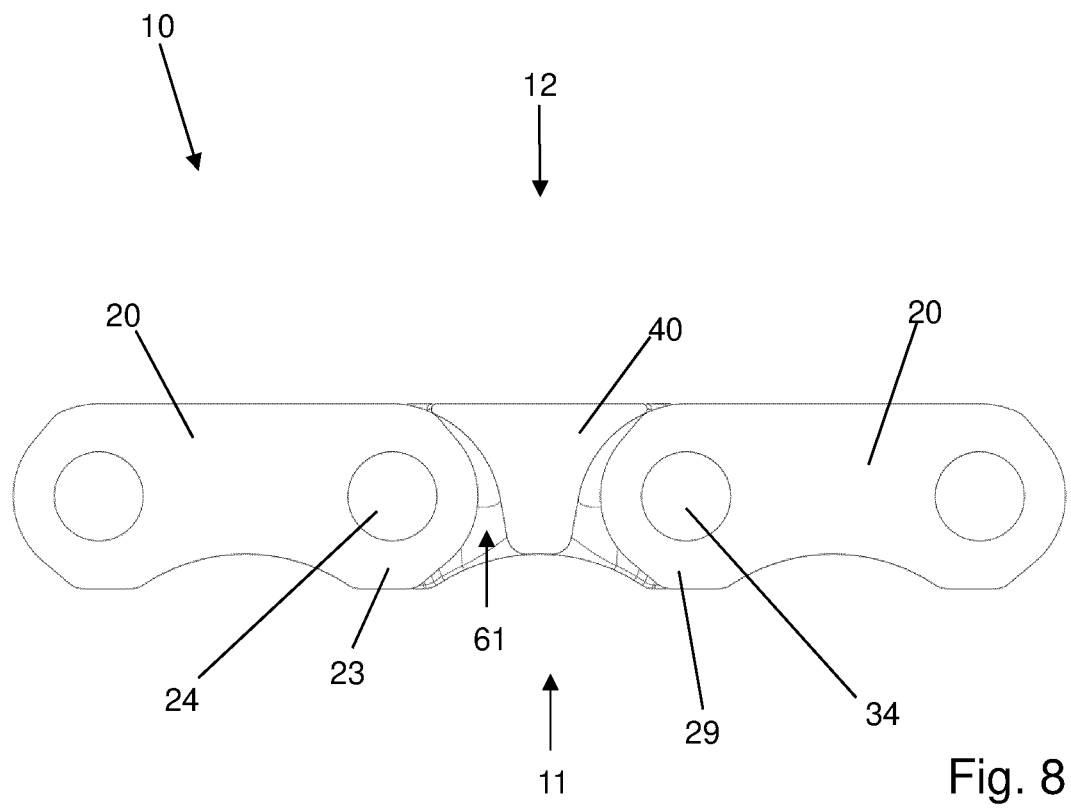
Figure 9:
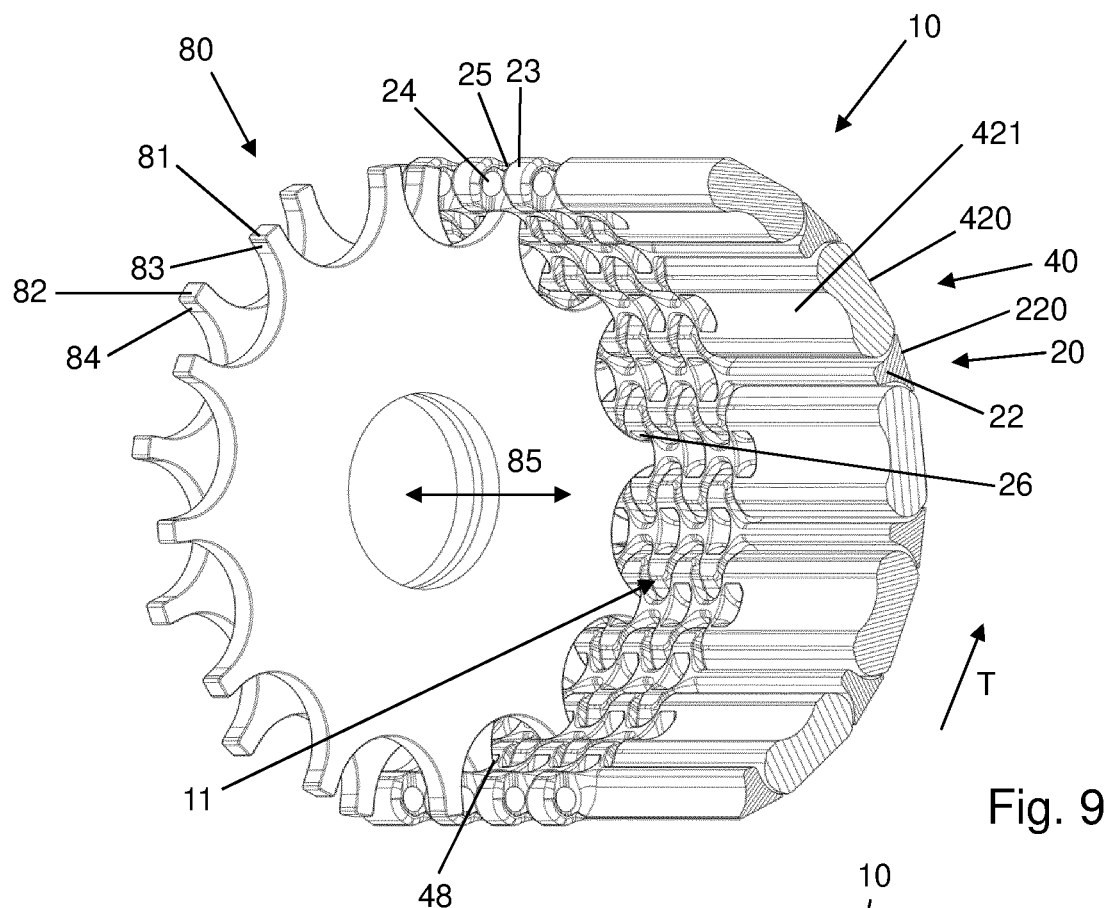
Figure 10:
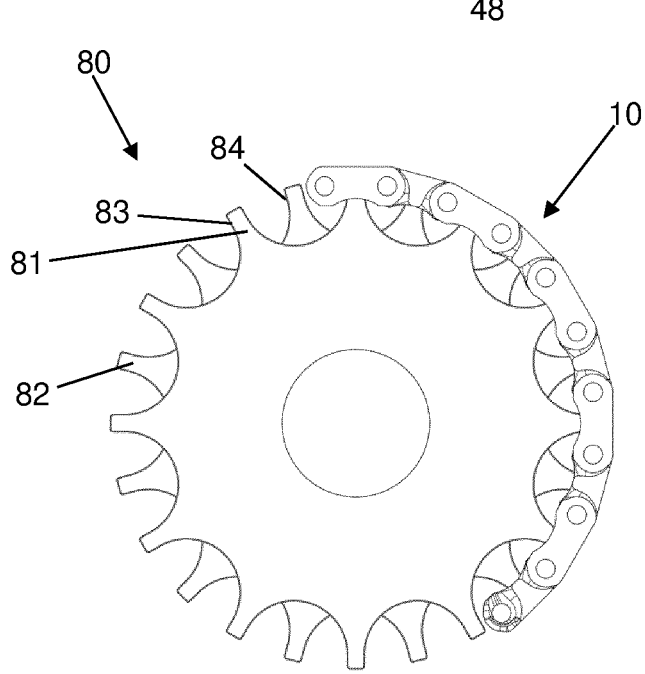
Figure 11:
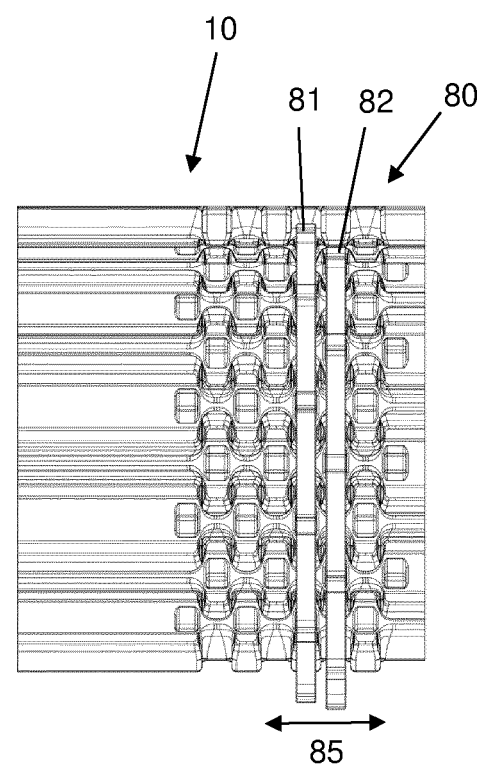
Figure 12:
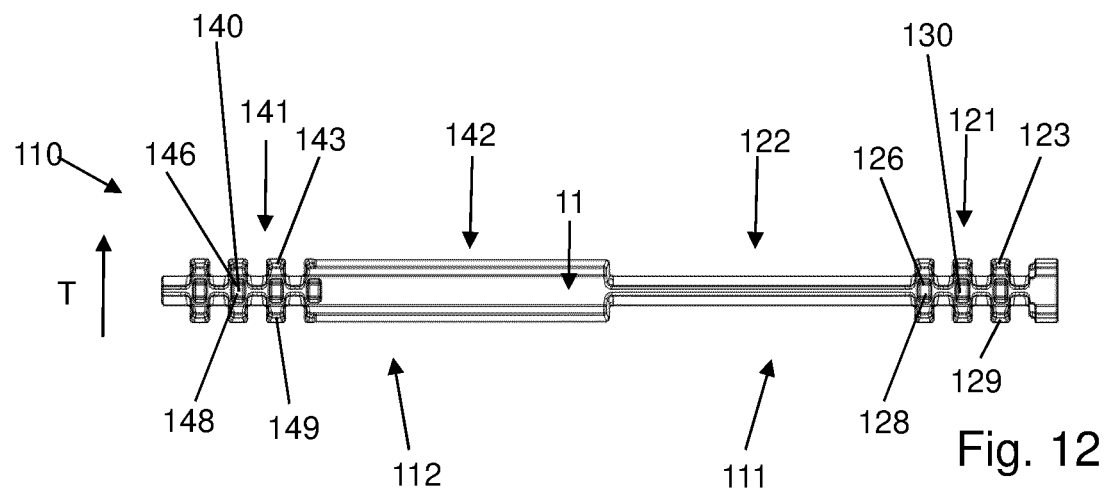
Figure 13:
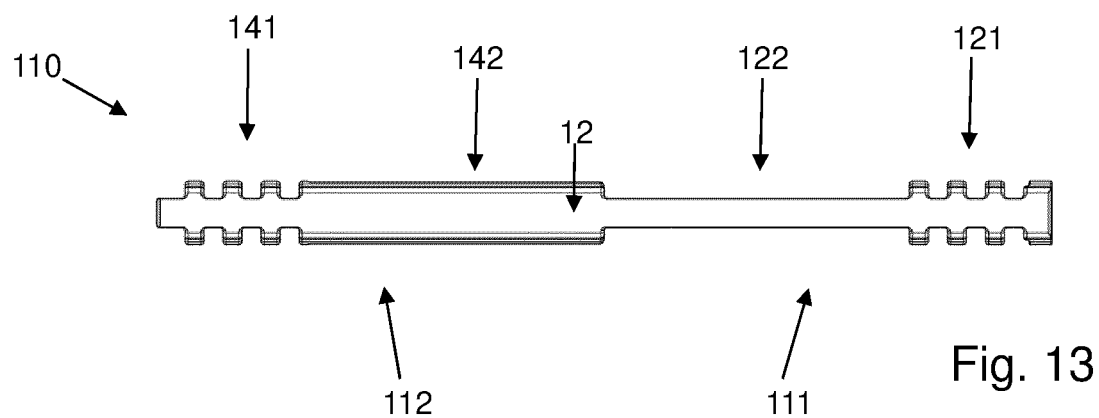

Further advantages, features, and objects of the invention will be apparent from the following detailed description of two embodiments of a modular conveyor belt according to the invention in conjunction with the associated drawings, wherein the drawings show:

FIG. 1—an arrangement of three adjacent belt modules of three adjacent rows according to a first embodiment of the modular conveyor belt in a bottom perspective view;

FIG. 2—a first type of belt module of the modular conveyor belt of FIG. 1 in a bottom view;

FIG. 3—the first type of belt module shown in FIG. 2 in a top view;

FIG. 4—an enlarged bottom view of a link section and a portion of the middle section of the first type of belt module shown in FIG. 2;

FIG. 5—a second type of belt module of the modular conveyor belt of FIG. 1 in a bottom view;

FIG. 6—the second type of belt module shown in FIG. 5 in a top view;

FIG. 7—an enlarged bottom view of a link section and a portion of the middle section of the second type of belt module shown in FIG. 5;

FIG. 8—a side view of the arrangement of three adjacent belt modules of FIG. 1;

FIG. 9—a perspective view of the first embodiment of the modular conveyor belt of FIG. 1 engaged with a drive sprocket;

FIG. 10—the arrangement of FIG. 9 in a side view;

FIG. 11—the arrangement of FIG. 9 in a plan view from inside the modular conveyor belt;

FIG. 12—a belt module of a second embodiment of the modular conveyor belt in a bottom view;

FIG. 13—the belt module shown in FIG. 12 in a top view; and

Figure 14:
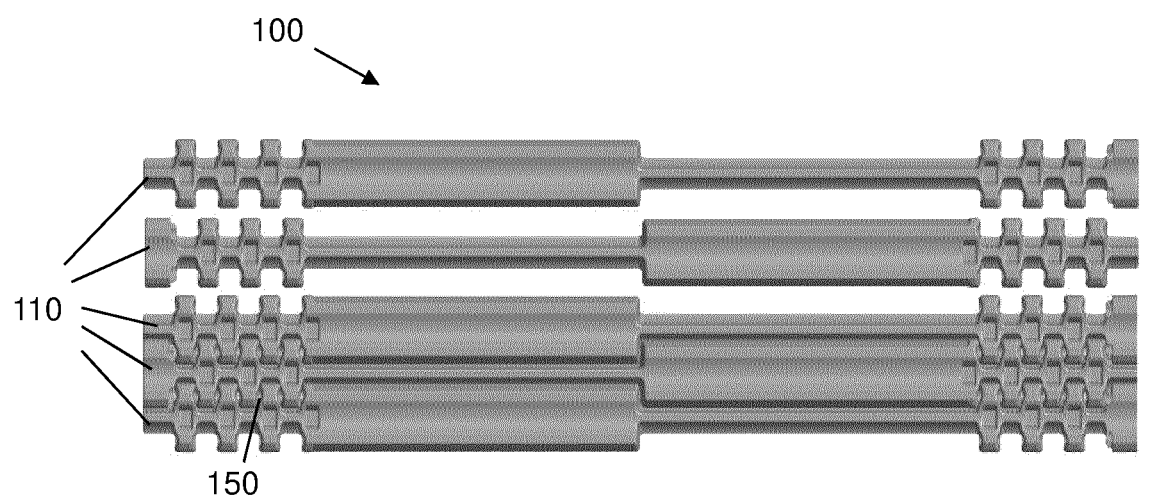

FIG. 14—an arrangement of belt modules according to FIG. 12 in a way to form a modular conveyor belt.

The following observations apply in respect of the description which follows: where, for the purpose of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference signs that are less relevant for immediate understanding are not included in all Figures. In that case, reference should be made to the other Figures.

FIG. 1 shows a bottom side 11 of a part of a modular conveyor belt 10 according to a first embodiment in a perspective view. Three adjacently arranged belt modules are shown, wherein a belt module 40 of one type is arranged between two belt modules 20 of a different type. Each belt module 20 comprises two link sections 21 and a first middle section 22 between the two link sections 21, as can be better seen in FIGS. 2 and 3. The belt module 40 comprises two link sections 41 and a second middle section 22 between the two link sections 41, as can be better seen in FIGS. 5 and 6.

Each belt module 20 forms a first row of one belt module, whereas the belt module 40 forms a second row of one belt module. The whole modular conveyor belt 10 comprises a plurality of first rows of one belt module 20 and a plurality of second rows of one belt module 40, wherein the first rows and the second rows are alternately interlinked with each other by intercalating link sections 21, 41 of adjacent belt modules 20, 40 of adjacent first and second rows.

The first and second middle sections 22, 42 of the belt modules 20, 40 of the first and second rows are devoid of linking means. The first middle section 22 of the belt module 20 has a first flat top surface 220 and tapers to the bottom side 11, as can be best seen in FIGS. 2 to 4 and 9. The second middle section 42 of the belt module 40 has a second flat top surface 420 and a plate-like shape with a concave channel-like recess 421 at the bottom side 11, as can be best seen in FIGS. 1, 5 to 7 and 9. The first flat top surface 220 has a first width in the direction of belt travel, whereas the second flat top surface 420 has a second width in the direction of belt travel T, which is bigger than the first width. The first flat top surface 220 and the second flat top surface 420 are complementary so as to form an essentially closed combined flat top surface when the adjacent belt modules 20, 40 are arranged in a substantially straight line as shown in FIG. 1.

Regarding the link sections, it is to be noted that, as can be seen from FIGS. 1 to 4, each link section 21 comprises a first plurality of link ends 23 extending in a direction of belt travel T and a second plurality of link ends 29 extending in a direction opposite to the direction of belt travel T. The link ends 23 have each a pivot rod opening 24 disposed therein in a direction substantially perpendicular to the direction of belt travel T. The pivot rod openings 24 are aligned with each other, i.e. they form a line-of-sight tunnel. The link ends 29 have each a pivot rod opening 34 disposed therein in a direction substantially perpendicular to the direction of belt travel T. The pivot rod openings 34 are aligned with each other, i.e. they form a line-of-sight tunnel.

As can be seen from FIGS. 1 and 5 to 7, each link section 41 comprises a first plurality of link ends 43 extending in a direction of belt travel T and a second plurality of link ends 49 extending in a direction opposite to the direction of belt travel T. The link ends 43 have each a pivot rod opening 44 disposed therein in a direction substantially perpendicular to the direction of belt travel T. The pivot rod openings 44 are aligned with each other, i.e. they form a line-of-sight tunnel.

The link ends 49 have each a pivot rod opening 54 disposed therein in a direction substantially perpendicular to the direction of belt travel T. The pivot rod openings 54 are aligned with each other, i.e. they form a line-of-sight tunnel.

The first plurality of link ends 23, 43 of one of the link sections 21, 41 and the second plurality of link ends 29, 49 of an adjacent link section 21, 41 of an adjacent belt module 20, 40 are intercalated such that the respective pivot rod openings 24, 34, 44, 54 are aligned, i.e. form a line-of-sight tunnel, and hingedly connected by a pivot rod disposed through the aligned pivot rod openings 24, 34, 44, 54. The intercalation of link ends 23, 29, 43, 49 is made possible by interspaces 25 between two link ends 23 or between two link ends 29, which have a width which is bigger than the width of a link end 43 or 49, and by interspaces 45 between two link ends 43 or between two link ends 49, which have a width which is bigger than the width of a link end 23 or 29.

Referring in particular to FIGS. 2 and 4, the belt modules 20 of the first rows comprise a plurality of indentations 30 on the bottom side of the link sections 21, each indentation 30 being arranged in a region between a link end 23 and a link end 29. A bordering wall of an indentation 30 forms a first drive surface 26 for receiving a force-transmitting surface 83 of a first series of force-transmitting surfaces 83 of a drive sprocket 80, see FIGS. 9 to 11.

Referring in particular to FIGS. 5 and 7, the belt modules 40 of the second rows comprise a plurality of indentations 46 on the bottom side of the link sections 41, each indentation 46 being arranged in a region between a link end 43 and a link end 49. A bordering wall of an indentation 46 forms a second drive surface 48 for receiving a force-transmitting surface 84 of a second series of force-transmitting surfaces 84 of the drive sprocket 80, see FIGS. 9 to 11.

FIGS. 9, 10 and 11 show the modular conveyor belt 10 in a situation, where it is engaged with the drive sprocket 80 used for driving the modular conveyor belt 10. FIG. 9 shows a perspective view of the situation, FIG. 10 is a side view, and FIG. 11 is a plan view from inside the modular conveyor belt.

As can be seen, the drive sprocket 80 comprises a first series of teeth 81 and a second series of teeth 82 that are arranged offset from each other in the direction of belt travel T of the modular conveyor belt 10 (rotation direction of the drive sprocket 80). The teeth 81 of the drive sprocket 80 engage into the indentations 30 of the belt modules 20 of the first rows, whereas the teeth 82 of the drive sprocket 80 engage into the indentations 46 of the belt modules 40 of the second rows. The force-transmitting surfaces 83 engaging the first drive surfaces 26 are provided on the first series of teeth 81 and the force-transmitting surfaces 84 engaging the second drive surfaces 48 are provided on the second series of teeth 82.

It can be seen from FIGS. 9, 10 and 11 that the first series of teeth 81 and the second series of teeth 82 of the drive sprocket 80 are slightly offset from each other in an axial direction 85 of the drive sprocket 80 (width direction of the modular conveyor belt 10). It follows that the first drive surfaces 26 of the first rows engaged by the first series of teeth 81 are arranged along a first line in a direction of belt travel T, the second drive surfaces 48 of the second rows engaged by the second series of teeth 82 are arranged along a second line in the direction of belt travel T, and the first line and the second line are offset with respect to each other.

Other advantageous features of the belt modules 20 and 40 are fluid guiding structures, which are best visible in FIGS. 1, 4 and 7. As can be seen there, the belt modules 20, 40 comprise on the bottom side a plurality of fluid guiding structures 27 and 47, respectively, designed and arranged so as to deflect a fluid jet impinging on the bottom side and guide the deflected fluid jet towards one of the adjacent belt modules of one of the adjacent rows. Each fluid guiding structure 27, 47 comprises an outwardly fan-shaped portion, which is somewhat V-shaped, designed and arranged so as to direct and spread an impinging fluid jet towards one of the adjacent belt modules of one of the adjacent rows. The fluid guiding structures 27, 47 are arranged in the link sections 21, 41 between the link ends 23, 29, 43, 49 and the indentations 30, 46.

The fluid guiding structures 27, 47 have preferably an arcuate shape, so that a fluid jet that impinges in a direction approximately perpendicular to the bottom surface of the belt modules 20, 40 is redirected in a direction that is somewhat parallel to the moving direction of the modular conveyor belt 10 (or at a certain angle of maximal about 20°).

The fluid guiding structures 27, 47 are made with rounded or arcuate shapes, without edges or corners. They have a channel-like design for guiding the deflected fluid jet towards the adjacent belt module of the adjacent row. They also have a trough-like shape to deflect and guide the impinging fluid jet to the front surface and both side surfaces of the intercalating link end of the adjacent belt module.

FIG. 8 shows another important feature, namely that between a belt module 20 of one of the first rows and an adjacent belt module 40 of one of the adjacent second rows a gap 61 is formed which broadens towards the bottom 11 of the modular conveyor belt 10. The belt modules 20, 40 are designed and arranged such that the gap 61 is essentially closed at a top surface 12 of the modular conveyor belt 10 when the adjacent belt modules 20, 40 of the first and second rows are aligned along a substantially straight line, as this is shown in FIG. 8, and such that the gap 61 is open at the top surface 12 when the adjacent belt modules 20, 40 of the first and second rows are tilted with respect to each other.

FIGS. 12 to 14 show a second embodiment of a modular conveyor belt 100 according to the invention. In contrast to the first embodiment of a modular conveyor belt 10, employing two different types of belt modules 20, 40, the modular conveyor belt 100 uses only one type of specially shaped belt modules 110. FIG. 12 shows such a belt module 110 in a bottom view, whereas FIG. 13 shows the belt module 110 in a top view.

The belt module 110 has two distinct halves 111, 112. The half 111 comprises a link section 121 and a middle section portion 122. The half 112 comprises a link section 141 and a middle section portion 142. The middle section portions 122 and 142 form together the middle section of the belt module 110.

The design of the link section 121 comprising a first plurality of link ends 123, a second plurality of link ends 129, indentations 130 and drive surfaces 126, 128 and of the middle section portion 122 of the first half 111 (right side in FIG. 12) of belt module 110 is similar to the design of the link sections 21 and the middle section 22 of the first type of belt module 20, as shown in the FIGS. 2 to 4. The design of the link section 141 comprising a first plurality of link ends 143, a second plurality of link ends 149, indentations 140 and drive surfaces 146, 148 and of the middle section portion 142 of the second half 112 of belt module 110 (left side in FIG. 12) is similar to the design of the link sections 41 and the middle section 42 of the second type of belt module 40, as shown in FIGS. 5 to 7.

FIG. 14 shows the arrangement of several belt modules 110 in a way to form a modular conveyor belt 100. For doing this, every second belt module 110 is turned around a centre axis by 180°. In this way, a plurality of first rows of one belt module 110 and a plurality of second rows of one belt module 110 is formed, wherein the belt modules 110 of the first rows and of the second rows are identical, but the belt modules of the second rows are turned by 180° with respect to the belt modules of the first rows. Similar to the first embodiment of a modular conveyor belt 10, the belt modules 110 of the first rows and of the second rows are interlinked by pivot rods 150.

An advantage of the design idea of a modular conveyor belt 100 according to the second embodiment is that only a single type of belt module 110 is necessary, so that storage of spare parts can be simplified. Further, only one set of tools for injection moulding moulds for manufacture of the belt modules 110 is necessary.

The invention claimed is:

1. A modular conveyor belt comprising a plurality of first rows of one or more belt modules and a plurality of second rows of one or more belt modules, wherein each belt module comprises at least two link sections and the first rows and the second rows are alternately interlinked with each other by intercalating link sections of adjacent belt modules of adjacent first and second rows, wherein each of the first rows comprises a first drive surface for receiving a force-transmitting surface of a first series of force-transmitting surfaces of a drive sprocket, the first drive surfaces of the first rows being arranged along a first line in a direction of belt travel, and each of the second rows comprises a second drive surface for receiving a force-transmitting surface of a second series of force-transmitting surfaces of the drive sprocket or a further drive sprocket, the second drive surfaces of the second rows being arranged along a second line in the direction of belt travel (T), wherein the first line and the second line are offset with respect to each other, characterised in that at least one of the belt modules of one of the first rows comprises a first middle section between two link sections, which has a first flat top surface and is arranged adjacent to a second middle section between two link sections of an adjacent belt module of one of the adjacent second rows having a second flat top surface, wherein the first flat top surface and the second flat top surface have a different width in the direction of belt travel (T) at least in adjacent zones and the first and second middle sections are devoid of linking means.

2. The modular conveyor belt according to claim 1, characterised in that the second rows of one or more belt modules are devoid of first drive surfaces and/or the first rows of one or more belt modules are devoid of second drive surfaces.

3. The modular conveyor belt according to claim 1, characterised in that the link sections comprise a first plurality of link ends extending in a direction of belt travel (T) and having a pivot rod opening disposed therein in a direction substantially perpendicular to the direction of belt travel (T), and a second plurality of link ends extending in a direction opposite to the direction of belt travel (T) and having a pivot rod opening disposed therein in a direction substantially perpendicular to the direction of belt travel (T), the first plurality of link ends of one of the link sections and the second plurality of link ends of an adjacent link section of an adjacent belt module being intercalated and hingedly connected by at least one pivot rod disposed through at least some of the pivot rod openings.

4. The modular conveyor belt according to claim 1, characterised in that the distance between two successive first drive surfaces along the first line in the direction of belt travel (T) is equal to the distance between two successive second drive surfaces along the second line in the direction of belt travel (T), and preferably the first drive surfaces and the second drive surfaces are offset in the direction of belt travel (T) with respect to each other by a half of this distance.

5. The modular conveyor belt according to claim 1, characterised in that at least one of the first drive surfaces and/or the second drive surfaces is formed by a bordering wall of an indentation on a bottom side of one of the belt modules and/or by an end surface of one of the link ends.

6. The modular conveyor belt according to claim 1, characterised in that adjacent first and second middle sections of adjacent belt modules have complementary first and second flat top surfaces so as to form an essentially closed combined flat top surface when the adjacent belt modules are arranged in a substantially straight line.

7. The modular conveyor belt according to claim 1, characterised in that the belt modules of the first rows and of the second rows are identical, but the belt modules of the second rows are turned by 180° with respect to the belt modules of the first rows.

8. The modular conveyor belt according to claim 1, characterised in that between a belt module of one of the first rows and an adjacent belt module of one of the adjacent second rows a gap is formed which broadens towards the bottom of the modular conveyor belt.

9. The modular conveyor belt according to claim 8, characterised in that the belt modules are designed and arranged such that the gap is essentially closed at a top surface of the modular conveyor belt when the adjacent belt modules of the first and second rows are aligned along a substantially straight line and such that the gap is open at the top surface of the modular conveyor belt when the adjacent belt modules of the first and second rows are tilted with respect to each other.

10. The modular conveyor belt according to claim 1, characterised in that at least one of the belt modules of the modular conveyor belt comprises on its bottom side at least one fluid guiding structure designed and arranged so as to deflect a fluid jet impinging on the bottom side and guide the deflected fluid jet towards one of the adjacent belt modules of one of the adjacent rows.

11. The modular conveyor belt according to claim 10, characterised in that at least one of the fluid guiding structures comprises an outwardly fan-shaped portion designed and arranged so as to direct and spread an impinging fluid jet towards one of the adjacent belt modules of one of the adjacent rows.

12. The modular conveyor belt according to claim 10, characterised in that the at least one fluid guiding structure is shaped without edges or corners.

13. A conveyor comprising a modular conveyor belt according to claim 1 and at least one drive sprocket comprising a first series of force-transmitting surfaces for engaging the first drive surfaces of the first rows of one or more belt modules and a second series of force-transmitting surfaces for engaging the second drive surfaces of the second rows of one or more belt modules.

14. The conveyor according to claim 13, characterised in that the force-transmitting surfaces for engaging the first drive surfaces are provided on a first series of teeth of the at least one drive sprocket and the force-transmitting surfaces for engaging the second drive surfaces are provided on a second series of teeth of the at least one drive sprocket, wherein the first series of teeth and the second series of teeth are preferably arranged offset from each other in the direction of belt travel (T) of the modular conveyor belt.

* * * * *